(12) United States Patent
Schroeder

(10) Patent No.: US 9,820,081 B2
(45) Date of Patent: Nov. 14, 2017

(54) TRANSFERRING A DESCRIPTIVE WEB INTERFACE LANGUAGE CODE BETWEEN TWO NEARFIELD COMMUNICATION DEVICES

(71) Applicant: NXP B.V., Eindhoven (NL)

(72) Inventor: Juergen Schroeder, Graz (AT)

(73) Assignee: NXP B.V., Eindhoven (NL)

( * ) Notice: Subject to any disclaimer, the term of this patent is extended or adjusted under 35 U.S.C. 154(b) by 29 days.

(21) Appl. No.: 14/510,877

(22) Filed: Oct. 9, 2014

(65) Prior Publication Data
US 2015/0105021 A1  Apr. 16, 2015

(30) Foreign Application Priority Data
Oct. 11, 2013 (EP) ...................................... 13188278

(51) Int. Cl.
| | |
|---|---|
| *H04W 4/00* | (2009.01) |
| *H04M 1/725* | (2006.01) |
| *H04L 29/08* | (2006.01) |

(52) U.S. Cl.
CPC ............. *H04W 4/008* (2013.01); *H04L 67/34* (2013.01); *H04M 1/7253* (2013.01); *H04M 2250/04* (2013.01)

(58) Field of Classification Search
USPC ........ 455/41.1, 41.2, 41.3, 414.1; 340/10.33, 340/10.51, 5.61
See application file for complete search history.

(56) References Cited

U.S. PATENT DOCUMENTS

| | | | |
|---|---|---|---|
| 8,566,420 B2 | 10/2013 | Savinen et al. | |
| 2006/0179079 A1* | 8/2006 | Kolehmainen | ....... G06F 9/4862 |
| 2007/0218837 A1 | 9/2007 | Lessing et al. | |
| 2008/0046570 A1 | 2/2008 | Abel | |
| 2009/0298426 A1* | 12/2009 | Helvick | ................ G06Q 10/02 455/41.1 |
| 2010/0120402 A1* | 5/2010 | Sethi | ....................... H04W 4/02 455/414.1 |

(Continued)

FOREIGN PATENT DOCUMENTS

| | | |
|---|---|---|
| CN | 101351970 A | 1/2009 |
| CN | 101855616 A | 10/2010 |

OTHER PUBLICATIONS

Office Action from foreign CN counterpart patent appln. No. 201410468518.8. (Apr. 17, 2017).

*Primary Examiner* — Ganiyu A Hanidu

(57) ABSTRACT

It is described a method for a wireless Near Field Communication (NFC) between a NFC enabled device (110) and a NFC capable mobile telecommunication end device (120). The provided method comprises transferring data from the NFC enabled device (110) to the NFC capable mobile telecommunication end device (120). Thereby, at least some of the transferred data represent a code in a descriptive web interface language. Further, a NFC capable mobile telecommunication end device (120) and a NFC enabled device (110) are described for participating in such a NFC method. Furthermore, a system (100) comprising such a NFC enabled device (110) and such a NFC capable mobile telecommunication end device (120) and a computer program for enabling such a NFC method are described.

10 Claims, 1 Drawing Sheet

(56) References Cited

U.S. PATENT DOCUMENTS

| | | | |
|---|---|---|---|
| 2011/0165859 A1* | 7/2011 | Wengrovitz | H04M 1/7253 455/411 |
| 2011/0182250 A1* | 7/2011 | Shin | H04W 4/00 370/329 |
| 2012/0200390 A1* | 8/2012 | Saravanan | G07C 9/00111 340/5.61 |
| 2012/0289155 A1 | 11/2012 | Dua | |
| 2013/0054697 A1* | 2/2013 | Cha | H04N 21/2347 709/204 |
| 2013/0111328 A1* | 5/2013 | Khanna | G06F 17/3089 715/234 |
| 2013/0171929 A1* | 7/2013 | Adams | H04W 4/008 455/41.1 |
| 2013/0271268 A1* | 10/2013 | Brandsma | G06K 7/10009 340/10.33 |

* cited by examiner

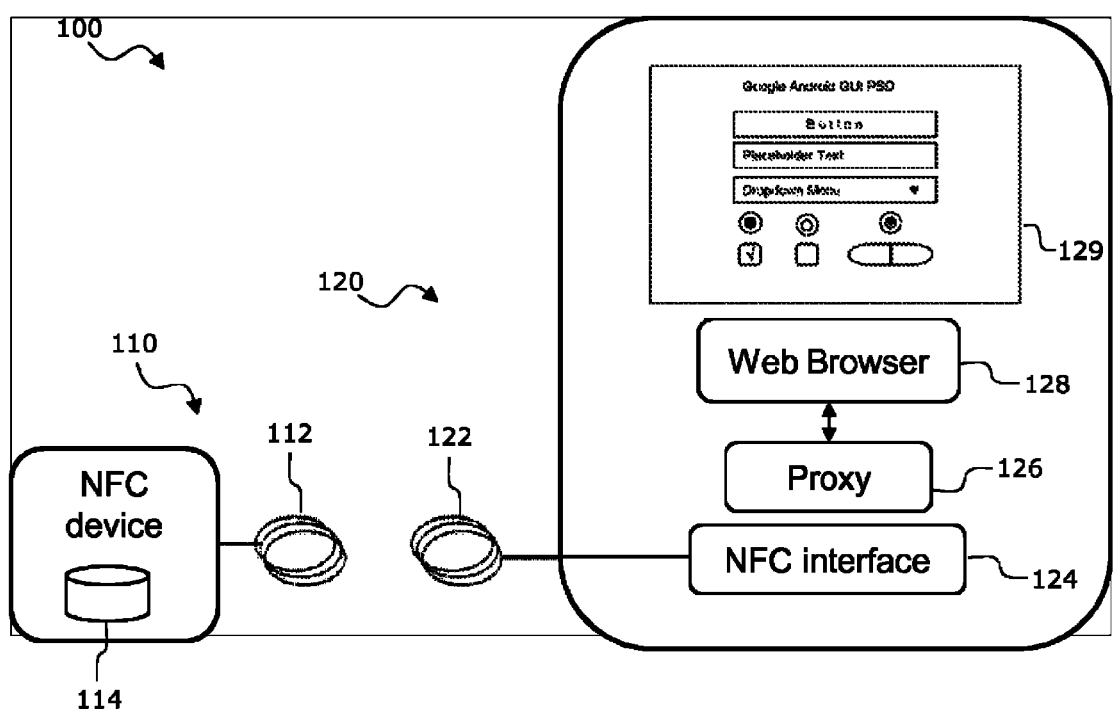

TRANSFERRING A DESCRIPTIVE WEB INTERFACE LANGUAGE CODE BETWEEN TWO NEARFIELD COMMUNICATION DEVICES

CROSS-REFERENCE TO RELATED APPLICATIONS

This application claims the priority under 35 U.S.C. §119 of European patent application no. 13188278.9, filed on Oct. 11, 2013, the contents of which are incorporated by reference herein.

FIELD OF THE INVENTION

The present invention relates to the technical field of wireless Near Field Communication (NFC). In particular, the present invention related to a method for a wireless NFC between a NFC enabled device and a NFC capable mobile telecommunication end device. Further, the present invention relates to a NFC capable mobile telecommunication end device and to a NFC enabled device which are configured for participating in a NFC method as described above. Furthermore, the present invention relates to a system comprising such a NFC enabled device and such a NFC capable mobile telecommunication end device and to a computer program for enabling such a NFC method.

BACKGROUND OF THE INVENTION

Near field communication (NFC) is an international set of standards for transmitting data in a contactless manner by means of radio technology over short distances of only a few centimeters with a data transfer rate of currently up to 424 kBit/s. However, it is expected that in the future higher data transfer rates in the region of several MBit/s will be reached.

NFC communication can be carried out e.g. between smartphones and similar communication end devices in order to establish a radio communication with each other by touching them together or bringing them into close proximity with each other. However, since NFC standards are based on existing radio-frequency identification (RFID) standards NFC can also be accomplished with smartcards or other passive or active communication devices which comprise a passive RFID tag or an active RFID reader.

Communication between (a) a NFC enabled device such as e.g. a smartcard, a RFID tag, RFID reader, or any communication device being capable of participating in NFC and (b) a NFC capable mobile communication end device such as e.g. a mobile phone and in particular a smartphone requires a dedicated application specific applet, e.g. a so called App, being installed on the mobile communication end device. Thereby, the type of the dedicated application specific applet depends on the type of the NFC enabled device and on the type and/or the operating system of the NFC capable mobile communication end device. This means that each time a new NFC application is supposed to be used by a NFC capable mobile communication end device, a new dedicated application specific applet needs to be downloaded by the NFC capable mobile communication end device typically from the internet. In a next step the new dedicated application specific applet needs to be installed on the NFC capable mobile communication end device. In addition, the selection of a correct dedicated application specific applet for a dedicated application requires an entry and/or a support of a user of the NFC capable mobile communication end device. Thereby, a proper dedicated application specific applet or an application specific applet needs to be selected by the user. This makes the idea of a single touch user experience impossible when a new NFC is supposed to be used.

Further, due to the requirement for installing and downloading a dedicated application specific applet a NFC connection between (a) an NFC enabled device and (b) a NFC capable mobile communication end device typically requires the presence of a communication network such as a mobile radio communication network (e.g. a GSM, a UMTS, or a LTE network) or a local area network (e.g. a LAN network) for downloading a dedicated application specific applet to the NFC capable mobile communication end device.

Furthermore, an interoperability of dedicated application specific applets on NFC capable mobile communication end devices with different operating systems is not guaranteed.

There may be a need for facilitating a NFC between (a) an NFC enabled device and (b) a NFC capable mobile communication end device.

OBJECT AND SUMMARY OF THE INVENTION

This need may be met by the subject matter according to the independent claims. Advantageous embodiments of the present invention are described by the dependent claims.

According to a first aspect of the invention there is provided a method for a wireless Near Field Communication (NFC) between a NFC enabled device and a NFC capable mobile telecommunication end device. The provided method comprises transferring data from the NFC enabled device to the NFC capable mobile telecommunication end device, wherein at least some of the transferred data represent a code in a descriptive web interface language.

The described method is based in the idea that a Near Field Communication (NFC) being established between a NFC enabled device and a NFC capable mobile telecommunication end device can be used for transferring or transmitting data wherein at least a part of the transferred or transmitted data represents a data code of a descriptive web interface language. This may provide the advantage that the data code can be directly fed to a Web Browser which is installed on the NFC capable mobile telecommunication end device. Thereby, the data code may prompt the installed Web Browser to display an appropriate image content on a Graphical User Interface (GUI) of the NFC capable mobile telecommunication end device. This image content may be interactive such that a user of the NFC capable mobile communication end device will be able to give inputs or any other commands which could then be forwarded to the NFC enabled device.

The NFC enabled device may be any entity which is capable of participating in a NFC. The NFC enabled device may be for instance a Smartcard, a radio-frequency identification (RFID) tag, or a NFC reader/writer. The NFC enabled device may be associated with a certain physical machine which comprises actual properties. These actual properties may be stored as corresponding property data in a memory of the NFC enabled device. The corresponding property data may be transferred to the NFC capable mobile communication end device together with the described code in the mentioned descriptive web interface language. Alternatively or in combination the corresponding property data of the physical machine may be transferred to the NFC capable mobile communication end device after the descriptive web interface language code has been transferred to the NFC capable mobile communication end device and a corresponding data link between the NFC enabled device and the NFC capable mobile communication end device has been established.

The NFC capable mobile communication end device may be any communication end device such as mobile phone, a smartphone, a notebook computer, a tablet PC, or a personal digital assistant (PDA) which is equipped with an NFC interface which allows the NFC capable mobile communication end device to perform a NFC communication. Preferably, a Web Browser is installed on the NFC capable mobile communication end device such that the descriptive web interface language code can be displayed of a GUI of the NFC capable mobile communication end device.

It is mentioned that in case the NFC capable mobile communication end device is a mobile phone it is not relevant whether the telephone functionality of the mobile phone is enabled or not.

The descriptive web interface language code may be any data code which can be processed independently from the type of a computer processing device of the NFC capable mobile telecommunication end device and/or independently from the specific operating system (e.g. Android) of the NFC capable mobile telecommunication end device. This means that the content of the transferred descriptive web interface language code can be displayed and, if applicable, further processed by the NFC capable mobile telecommunication end device in a reliable manner. The descriptive web interface language code may be for instance the machine independent programming language Java.

By contrast to known NFC technology between a NFC enabled device and a NFC capable mobile communication end device when employing the described NFC method it will be no longer necessary to install a dedicated application specific or custom specific applet onto the NFC capable mobile telecommunication end device wherein the dedicated application specific or custom specific applet is adapted to both (a) the type and/or the operating system of the NFC capable mobile communication end device and (b) the type of the NFC enabled device. As a consequence, even when first establishing a NFC between the NFC capable mobile communication end device and a so far unknown NFC enabled device it will not be necessary to have a network connection between the NFC capable mobile communication end device and a communication network (e.g. the internet) from which the dedicated application specific applet can be downloaded. As a consequence, for establishing a NFC between the NFC capable mobile communication end device and a so far unknown NFC enabled device it will no longer be necessary to have a reliable data connection between the NFC capable mobile communication end device and the mentioned communication network.

According to an embodiment of the invention the code in the descriptive web interface language is a Hypertext Markup Language (HTML) code. Using HTML language for the transferred data may provide the advantage that the described NFC method can be realized with NFC capable mobile telecommunication end device which have installed thereon already existing Web Browser applications. As a consequence, the described method can be implemented into currently available NFC capable mobile telecommunication end device without requiring a large effort for reprogramming the NFC capable mobile telecommunication end device.

According to a further embodiment of the invention the method further comprises realizing a Graphical User Interface (GUI) for the NFC enabled device by means of the descriptive web interface language code being interpreted with a browser application being installed on the NFC capable mobile telecommunication end device.

Descriptive speaking, with the described method there is used NFC technology in order to transfer a data code in a descriptive web interface language to a Web Browser being installed on a NFC capable mobile telecommunication end device (e.g. a smartphone) in order to display and the realized a device independent user interface.

According to a further embodiment of the invention the method further comprises (a) generating further data by the NFC capable mobile telecommunication end device in response to the transferred data, wherein the further data are indicative (i) for a response of a program being installed on the NFC capable mobile telecommunication end device and/or (ii) for a user interaction between the NFC capable mobile telecommunication end device and a user of the NFC capable mobile telecommunication end device, and (b) retransferring the generated further data from the NFC capable mobile telecommunication end device to the NFC enabled device.

The retransmitted generated further data may be used e.g. for configuring or for reconfiguring a certain physical machine which is associated with or which comprises the NFC enabled device. Thereby, also the future operation of the physical machine may be controlled.

The described user interaction between the NFC capable mobile telecommunication end device and a user of the NFC capable mobile telecommunication end device may be realized preferably via a Web Browser application, wherein information is displayed and wherein user inputs can be made. Of course, if the NFC capable mobile telecommunication end device is equipped with a speech recognition functionality, the information given by the user can also be given acoustically.

The physical machine may be for example a washing machine. Thereby, the operation of the washing machine can be monitored by means of the above mentioned Web Browser. Further, when the retransferred generated further data are control data for a future operation of the washing machine (e.g. a further washing cycle at a certain temperature or a centrifugation with a certain number of revolutions) the further operation can be controlled by a user of the NFC capable mobile telecommunication end device.

Although self-evident at this point it is nevertheless pointed out that the given example of a washing machine is not the only possible application for the described method. In principle the operational state of any arbitrary physical machine (being equipped or being associated with the NFC enabled device) can be monitored with the help of the NFC capable mobile telecommunication end device and, if applicable, the future operation of the physical machine can be controlled with the help of the NFC capable mobile telecommunication end device.

According to a further embodiment of the invention transferring data from the NFC enabled device to the NFC capable mobile telecommunication end device comprises (a) receiving the transferred data by means of a NFC interface of the NFC capable mobile telecommunication end device, (b) forwarding the received data to a proxy of the NFC capable mobile telecommunication end device, (c) processing the forwarded data by the proxy, and (d) forwarding the processed data to a Web Browser application being installed on the NFC capable mobile telecommunication end device. Using a proxy, which can be virtually realized by means of an appropriate program being installed on the NFC capable mobile telecommunication end device and/or which can be realized by a specific hardware (e.g. a proxy server) of the NFC capable mobile telecommunication end device may provide the advantage that the communication between the NFC interface and the Web Browser application can be facilitated by a standardization of the data transfer to the Web Browser application.

In this respect it is mentioned that the described proxy can also be used for facilitating a communication from the Web Browser application (e.g. in response to a user input) to the NFC interface.

According to a further aspect of the invention there is provided a NFC capable mobile telecommunication end device which comprises a NFC interface which is configured for receiving data from a NFC enabled device, wherein at least some of the received data represent a code in a descriptive web interface language.

Also the described NFC capable mobile telecommunication end device is based on the idea that a NFC being established between a NFC enabled device and the described NFC capable mobile telecommunication end device can be used for transferring data wherein at least a part of the transferred or transmitted data represents a data code of a descriptive web interface language. This may provide the advantage that the data code can be directly fed to a Web Browser which is installed on the NFC capable mobile telecommunication end device.

The NFC interface may be connected with or may comprise an antenna element, which is configured for receiving and/or for transmitting NFC radio signals.

The described NFC capable mobile communication end device may be any communication end device such as mobile phone, a smartphone, a notebook computer, a tablet PC, or a personal digital assistant (PDA) which is equipped with an NFC interface which allows the NFC capable mobile communication end device to perform a NFC communication.

According to an embodiment of the invention the NFC capable mobile telecommunication end device further comprises (a) a Web Browser application being installed on the NFC capable mobile telecommunication end device, and (b) a proxy being realized in between the NFC interface and the Web Browser application.

The proxy may be used as an interface between the NFC interface and the Web Browser application, wherein the (proxy) interface can be used for standardizing the data communication between the NFC interface and the Web Browser application. In this data communication the data may be transferred bidirectional i.e. (i) from the NFC interface to the Web Browser application and/or (ii) from the Web Browser application to the NFC interface. Data being transferred from the Web Browser application to the NFC interface may be in particular control data generated or prompted by a user input preferably at the Web Browser application, which control data are then forwarded by the NFC enabled device. The NFC enabled device can then use this data e.g. for controlling the operation of a physical machine being associated with or comprising the NFC enabled device.

According to a further aspect of the invention there is provided a NFC enabled device which comprises a memory which is configured for storing a code in a descriptive web interface language, wherein the NFC enabled device is configured for transferring data to a NFC capable mobile telecommunication end device.

Also the described NFC enabled device is based on the idea that a NFC being established between the described NFC enabled device and the a NFC capable mobile telecommunication end device can be used for transferring data wherein at least a part of the transferred or transmitted data represents a data code of a descriptive web interface language. This may provide the advantage that at the side of the NFC capable mobile telecommunication end device the data code can be directly fed to a Web Browser application which is installed on the NFC capable mobile telecommunication end device.

The NFC enabled device may be connected with or may comprise an antenna element, which is configured for transmitting and/or for receiving NFC radio signals.

The NFC enabled device may be any physical entity which is capable of participating in a NFC. The NFC enabled device may be for instance a Smartcard or a radio-frequency identification (RFID) tag.

According to a further aspect of the invention there is provided a system for a wireless Near Field Communication (NFC). The provided system comprises (a) a NFC capable mobile telecommunication end device as described above and (b) a NFC enabled device as described above.

According to a further aspect of the invention there is provided a computer program for enabling a wireless Near Field Communication (NFC) between a NFC enabled device and a NFC capable mobile telecommunication end device. The computer program, when being executed by a data processor, is adapted (a) for programming the NFC enabled device and/or (b) for programming the NFC capable mobile telecommunication end device in such a manner that the method as described above can be carried out.

As used herein, reference to a computer program is intended to be equivalent to a reference to a program element and/or to a computer readable medium containing instructions for controlling a system as described above to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the example of embodiment to be described hereinafter and are explained with reference to the example of embodiment. The invention will be described in more detail hereinafter with reference to example of embodiment but to which the invention is not limited.

BRIEF DESCRIPTION OF THE DRAWING

FIG. 1 shows a NFC system in accordance with an embodiment of the invention.

DESCRIPTION OF A PREFERRED EMBODIMENT

The only FIG. 1 shows a NFC system 100. The NFC system 100 comprises a NFC enabled device 110. According to the embodiment described here the NFC enabled device is a RFID tag 110. The NFC enabled device 110 comprises an antenna element 112 for transmitting and receiving NFC radio signals. The NFC enabled device 110 further comprises a memory 114. The memory 114 comprises data which are given in a descriptive web interface language such as HTML.

As can be seen from FIG. 1, the NFC system 100 further comprises a NFC capable mobile telecommunication end device 120. According to the embodiment described here the NFC capable mobile telecommunication end device is a smartphone 120. The NFC capable mobile telecommunication end device 120 respectively the smartphone 120 comprises an antenna element 122 for transmitting and receiving NFC radio signals. During operation of the NFC system 100 the two antenna elements 112 and 122 are located spatially close to each other such that NFC radio signals can be exchanged between these two antenna elements 112 and 122. The NFC capable mobile telecommunication end device/smartphone 120 further comprises an NFC interface 124 which is coupled on the one hand to the antenna element 122 and on the other hand to a proxy 126. The proxy 126 can be virtually realized by means of an appropriate program being installed on the NFC capable mobile telecommunication end device 120 and/or can be realized by a specific hardware (e.g. a proxy server) of the NFC capable mobile telecommunication end device 120. As can be seen from FIG. 1, the proxy 126 is in communication with a Web Browser application 128 which is installed on the NFC capable mobile telecommunication end device 120. Specifically, the proxy provides the Web Browser application 128 with HTML data such that they can be displayed by the Web Browser application 128 on a Graphical User Interface (GUI) 129 of the NFC capable mobile telecommunication end device 120.

Further, according to the embodiment described here the proxy 126 can receive user data which have been inputted to the Web Browser application 128 by a not depicted user of the NFC capable mobile telecommunication end device 120. These user data are then forwarded by the proxy 126 to the NFC interface 124 which itself causes that these user data are transmitted via an air interface extending between the two antenna elements 122 and 112 to the NFC enabled device 110.

In the following one not restrictive example for an application of the NFC system 100 is described. In this example the NFC enabled device 110 is assigned to an electric meter. For economical reasons this electric meter has neither a GUI nor a display. When a user wants to know the actual counter reading of the electric meter he or she approaches with his or her smartphone 120 the NFC enabled device 110 such that a NFC can take place between the two antenna elements 112 and 114. The NFC enabled device 110 will then send the counter reading of the electric meter in the format of HTML data to the smartphone 120. On the GUI 129 of the smartphone 120 the counter reading will then be display by the Web Browser application 128.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

REFERENCE NUMERALS

100 NFC system
110 NFC enabled device/RFID tag
112 antenna element
114 memory
120 NFC capable mobile telecommunication end device/smartphone
122 antenna element
124 NFC interface
126 proxy (application)
128 Web Browser application
129 Graphical User Interface (GUI)

The invention claimed is:

1. A method for a wireless Near Field Communication (NFC) between a NFC enabled device and a NFC capable mobile telecommunication end device, the method comprising:
transferring data from the NFC enabled device to the NFC capable mobile telecommunication end device having a computer processing device, wherein at least some of the transferred data represent a code in a descriptive web interface language such that the code can be directly fed to and prompt a Web Browser to display content on the Web Browser which is installed on the NFC capable mobile telecommunication end device,
wherein the code is processed independently from the computer processing device.

2. The method as set forth in claim 1, wherein the code in the descriptive web interface language is a Hypertext Markup Language (HTML) code.

3. The method as set forth in claim 1, further comprising realizing a Graphical User Interface for the NFC enabled device by means of the descriptive web interface language code being interpreted with a browser application being installed on the NFC capable mobile telecommunication end device.

4. The method as set forth in claim 1, further comprising generating further data by the NFC capable mobile telecommunication end device in response to the transferred data, wherein the further data are indicative
   (i) for a response of a program being installed on the NFC capable mobile telecommunication end device and/or
   (ii) for a user interaction between the NFC capable mobile telecommunication end device and a user of the NFC capable mobile telecommunication end device, and
retransferring the generated further data from the NFC capable mobile telecommunication end device to the NFC enabled device.

5. The method as set forth in claim 1, wherein transferring data from the NFC enabled device to the NFC capable mobile telecommunication end device comprises receiving the transferred data by means of a NFC interface of the NFC capable mobile telecommunication end device,
forwarding the received data to a proxy of the NFC capable mobile telecommunication end device, processing the forwarded data by the proxy, and forwarding the processed data to a Web Browser application being installed on the NFC capable mobile telecommunication end device.

6. A NFC capable mobile telecommunication end device comprising:
  a computer processing device;
  a NFC interface which is configured for receiving data from a NFC enabled device, wherein at least some of the received data represent a code in a descriptive web interface language such that the code can be directly fed to and prompt a Web Browser to display content on the Web Browser which is installed on the NFC capable mobile telecommunication end device,
  wherein the code is processed independently from the computer processing device.

7. The NFC capable mobile telecommunication end device as set forth in the preceding claim 6, further comprising
  a Web Browser application being installed on the NFC capable mobile telecommunication end device, and
  a proxy being realized in between the NFC interface and the Web Browser application.

8. A NFC enabled device comprising:
  a memory which is configured for storing a code in a descriptive web interface language such that the code can be directly fed to and prompt a Web Browser to display content on the Web Browser which is installed on a NFC capable mobile telecommunication end device, wherein the NFC enabled device is configured for transferring data to the NFC capable mobile telecommunication end device.

9. A system for a wireless Near Field Communication (NFC), the system comprising a NFC capable mobile telecommunication end device as set forth in claim 6 and a NFC enabled device.

10. A non-transitory computer readable medium for enabling a wireless Near Field Communication (NFC) between a NFC enabled device and a NFC capable mobile telecommunication end device, the computer readable medium, when being executed by a data processor, is configured
  (a) for programming the NFC enabled device and/or
  (b) for programming the NFC capable mobile telecommunication end device in such a manner that the method as set forth in claim 1 can be carried out.

* * * * *